US012786036B2

(12) United States Patent
Ferdinand et al.

(10) Patent No.: US 12,786,036 B2
(45) Date of Patent: Nov. 3, 2026

(54) SYSTEMS AND METHODS FOR AI-BASED MULTI-DIMENSIONAL MODULATION SHAPING

(71) Applicant: Samsung Electronics Company, Ltd., Suwon Si (KR)

(72) Inventors: Nuwan Suresh Ferdinand, Stittsville (CA); Sanjeewa Herath, Ottawa (CA)

(73) Assignee: SAMSUNG ELECTRONICS COMPANY, LTD., Suwon City (KR)

( * ) Notice: Subject to any disclaimer, the term of this patent is extended or adjusted under 35 U.S.C. 154(b) by 0 days.

(21) Appl. No.: 18/773,283

(22) Filed: Jul. 15, 2024

(65) Prior Publication Data

US 2026/0019319 A1 Jan. 15, 2026

(51) Int. Cl.

| | |
|---|---|
| ***H04L 27/34*** | (2006.01) |
| ***H04L 1/00*** | (2006.01) |
| ***H04L 27/36*** | (2006.01) |

(52) U.S. Cl.

CPC ........ *H04L 27/3405* (2013.01); *H04L 1/0003* (2013.01); *H04L 1/0009* (2013.01); *H04L 27/364* (2013.01)

(58) Field of Classification Search

CPC . H04L 27/3405; H04L 1/0003; H04L 1/0009; H04L 27/364

USPC .......................................................... 375/261

See application file for complete search history.

(56) References Cited

U.S. PATENT DOCUMENTS

| | | | | |
|---|---|---|---|---|
| 10,587,358 | B1 * | 3/2020 | Ebrahimzad | H04B 10/541 |
| 2020/0092057 | A1 * | 3/2020 | Herath | H04W 72/0466 |
| 2025/0132963 | A1 * | 4/2025 | Stark | G01S 1/0428 |

OTHER PUBLICATIONS

Loghin, et al., "Non-uniform constellations for ATSC 3.0," IEEE Trans. Broadcast., vol. 62, No. 1, pp. 197-203, Mar. 2016.

Cammerer, et al., "Trainable communication systems: Concepts and prototype," IEEE Transactions on Communications, arXiv:1911.13055v2 [CS.IT], 14 pages, Jun. 5, 2020.

* cited by examiner

*Primary Examiner* — Fitwi Y Hailegiorgis

(74) *Attorney, Agent, or Firm* — Baker Botts L.L.P.

(57) ABSTRACT

In one embodiment, a method includes accessing a stream of coded bits, generating multiple sub-streams of coded bits based on the accessed stream of coded bits, mapping the sub-stream of coded bits to multiple intermediate symbols, respectively, based on multiple respective bit-mapper models, generating multiple constellation symbols from the multiple intermediate symbols based on a symbol-mapper model, and transmitting a signal generated based on the constellation symbols to a computing system.

17 Claims, 11 Drawing Sheets

SYSTEMS AND METHODS FOR AI-BASED MULTI-DIMENSIONAL MODULATION SHAPING

TECHNICAL FIELD

This disclosure relates generally to wireless communications, and in particular relates to systems and methods for improving link-level performance in wireless communications.

BACKGROUND

Energy efficiency plays a significant role in the next generation wireless standards. In current communication systems such as 5G NR, at a conceptual level, the transmitter/receiver side operation can be described as follows. At first, the information bits are encoded by an encoder (for forward error correction (FEC)) such as low-density-parity check, polar code etc. The output bits of such FEC encoding process are commonly referred as coded bits. The coded bit stream contains some parity or redundancy which can be used at the receiver side for correcting the errors due to various impairments in the wireless channel such as receiver noise, interference, phase noise, quantization noise etc. This process is also known as forward error correction. The coded bits are mapped to constellation points and process of mapping bits to constellation point is commonly known as modulation. The modulation output is commonly represented by a constellation diagram. A constellation diagram is a representation of a signal modulated by a digital modulation scheme where constellation points represent the possible symbols to be transmitted based on the input bits.

DESCRIPTION OF EXAMPLE EMBODIMENTS

AI-Based Multi-Dimensional Modulation Shaping

Figure 1:
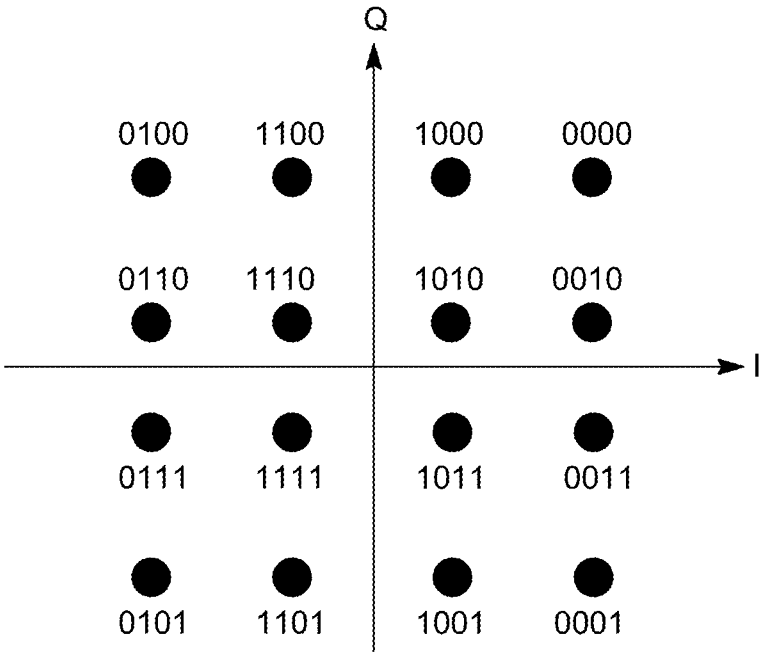
FIG. 1 illustrates an example constellation diagram of 16-QAM.

In particular embodiments, a communication system may utilize a bits-to-symbol mapping architecture (i.e., modulation method or constellation design) to improve the communication link performance. The bits-to-symbol mapping architecture may comprise multiple bits-to-symbol mappings in parallel followed by a symbol-level combiner. The communication system may identify parameters and configuration for the bits-to-symbol mappings and symbol-level combiner. In particular embodiments, the communication system may further utilize different methods on signaling for uplink, side link and downlink transmissions. The communication system may use different methods to perform measurements at both device side and network side, and report/signal such measurements. The bits-to-symbol mapping architecture disclosed herein can be adopted in wireless communication systems such as 5G-advanced/6G or other cellular/wireless systems as well as wired transmission schemes such as fiber optics and Ethernet cables, etc. The bits-to-symbol mapping architecture disclosed herein can be considered multi-dimensional constellation mapping because multiple bits-to-symbol mappings are used. In addition, parameters associated with the bits-to-symbol mappings can be optimized using AI or machine-learning techniques or other classical optimization techniques. In particular embodiments, the communication system may combine parallel and serial neural networks to exploit the shaping gain. Although this disclosure describes performing particular mappings by particular systems in a particular manner, this disclosure contemplates performing any suitable mapping by any suitable system in any suitable manner.

In particular embodiments, a first computing system may access a stream of coded bits. The first computing system may then generate a plurality of sub-streams of coded bits based on the accessed stream of coded bits. The first computing system may then map, based on a plurality of respective bit-mapper models, the plurality of sub-stream of coded bits to a plurality of intermediate symbols, respectively. The first computing system may generate, based on a symbol-mapper model, a plurality of constellation symbols from the plurality of intermediate symbols. The first computing system may further transmit a signal generated based on the plurality of constellation symbols to a second computing system.

Certain technical challenges exist for AI-based multi-dimensional modulation shaping. One technical challenge may include effectively utilizing the shaping gain of constellation. The solution presented by the embodiments disclosed herein to address this challenge may be using multiple bit mappers in parallel to process multiple streams of encoded bits followed by a symbol-level combiner as the multiple bit mappers may enable the system to harness higher shaping gain for a wide range of code rates. Another technical challenge may include training a machine-learning model for each of the bit mappers. The solution presented by the embodiments disclosed herein to address this challenge may be training the machine-learning model based on minimizing an average transmission power for signals given a particular bit error rate for signal transmission as the objective for training the machine-learning model aligns with the goal of improving energy efficiency in communication systems.

Certain embodiments disclosed herein may provide one or more technical advantages. A technical advantage of the embodiments may include improved energy efficiency of the communication system with high link reliability and/or high data rate as particular embodiments may harness higher shaping gain for a wide range of code rates and/or SINR/

SNR. Energy efficiency communication, high reliability and high data rate are key performance parameters of use scenarios such as ultra-reliable and low latency (URLLC) and enhanced mobile broadband (eMBB) targeted for future cellular systems/standard such as 5G-Advanced/6G. Another technical advantage of the embodiments may include direct impact in the future wireless standard/system as well as wired communication systems as particular embodiments may adopt some parameters, configuration, methods on measurement reporting in standard for communication link configuration and smooth functioning. Certain embodiments disclosed herein may provide none, some, or all of the above technical advantages. One or more other technical advantages may be readily apparent to one skilled in the art in view of the figures, descriptions, and claims of the present disclosure.

FIG. 1 illustrates an example constellation diagram of 16-QAM. The number of constellation points/symbols in a diagram may give the size of the constellation. Constellation points/symbols may be also referred as the alphabet of symbols that can be transmitted. Each constellation point/symbol may comprise in-phase component or quadrature component or both. In FIG. 1, in-phase component or quadrature component are shown by "I" label in the x-axis and "Q" label in the y-axis, respectively. The in-phase and quadrature components of a constellation point/symbol may be orthogonal to each other. As an example and not by way of limitation, one may use sine wave of in-phase component and cosine wave for quadrature component (or vice-versa) as sine wave and cosine wave are orthogonal to one another. Therefore, a constellation point/symbol can also be represented by a complex number (complex symbol), i.e., a+jb where $a, b \in \mathbb{R}$ and $j=\sqrt{-1}$. In some constellation such as QAM constellations, both in-phase and quadrature components exist while in some other constellations such as BPSK, only one component exists. Each constellation point/symbol may represent a set of bits (e.g., the four-bit label in FIG. 1). The size of the constellation may be finite. For example, for 16-QAM in FIG. 1, there are 16 constellation points/symbols. The size of the modulation is also referred as modulation order.

The process of modulation can be understood from the constellation diagram as a process of mapping bits to a symbol. Each symbol or constellation point/symbol may be represented or labeled by m bits. As an example and not by way of limitation, each of the 16 points/symbols in 16-QAM is labeled by 4 bits. The bit mapping/label of size 4 for each constellation point/symbol in 16-QAM may be labeled such that the nearest neighbor may differ only by one-bit position. For example, the constellation point/symbol represented by bit label '1010' has four nearest neighbors labeled as '1110', '1000', '0010', '1011' and these four labels '1110', '1000', '0010', '1011' differ only by one bit position. For example, '1010' differs at the third bit position with '1011' and '1010' differ at the first bit position with '1011' (counting bit positions from rightmost bit position or least significant bit position). Such bit labeling with only a single bit position difference with nearest neighbor is commonly referred as Gray labeling. Labeling other than Gray labeling also exists such as anti-Gray or non-Gray mapping. In anti-Gray mapping, the bit labeling for constellation points/symbols are chosen such that the nearest neighbor constellation points/symbols have the largest possible differences. In non-Gray mapping, bit labeling other than Gray is used. As an example and not by way of limitation, for a given constellation, computer search (an algorithm) can find a suitable bit labeling for the system under consideration. The overall communication link performance may depend on the bit labeling used.

Each constellation point/symbol may map equal number of bits. Therefore, transmission of one symbol may be equivalent to transmission of that many number of bits, for example, 4 bits per constellation point/symbol in 16-QAM. In this case, mapping is one-to-one. In other words, for given m bits, there are $2^m$ number of possibilities and for each possible combination of m bits, a single constellation point/symbol can be selected out of $2^m$ number of possibilities. It is possible to define a bit mapping/labeling to constellation point/symbol other than one-to-one mapping. In other words, one constellation point/symbol may represent two different bit labels. Other methods or processing (e.g., error correction code) in the communication system at transmitter side or receiver side or both may help differentiate which sequence of bits are being transmitted. For given m bits, a single constellation point/symbol may be selected. While a larger constellation point/symbol can carry a higher number of bits, a single point/symbol may represent the entire m bits. This approach of single point/symbol carrying a bit sequence is also referred as one-dimensional modulation. As such, dimensionality of the constellation is understood by the constellation. The typical scenario where only in-phase or quadrature or both components of a constellation is considered one-dimensional constellation. Therefore, the dimensionality is not explicitly mentioned.

In general, the difference between two-bit streams or bit sequences is commonly referred as the Hamming distance. The number of bit differences between two coded bit streams (i.e., Hamming distance between two valid code words) may have a significant impact on the error correction capability and in turn, the decoding performance and overall link performance.

In FIG. 1, each constellation point/symbol has an equal distance from one another in a grid (i.e., the constellation points/symbols are equally spaced in the grid). The distance between two constellation points/symbols is known as Euclidean distance. The Euclidean distance of a given constellation may also play an important role in the link performance. The minimum distance between two constellation points/symbols is known as the minimum distance or minimum Euclidean distance ($d_{min}$). The minimum distance may also play a role in the overall link performance, especially in a high signal-to-noise ratio (SNR) region. Depending on the propagation channel and its characteristics, the product of the minimum Euclidean distance, also known as product distance, may also play an important role in the overall link performance in some scenarios. Usually, at high SNR levels, high code rates may be used. Therefore, moderate to high SNR can be considered as high code rate region as well. By contrast, in low SNR regions, low code rates may be used. Because they play an important role in the communication link performance, different bit labeling for a given constellation, Euclidean distance, product distance, Hamming distance may be some of the important design parameters (among others) of interest when designing a communication system. In current wireless standards such as 3GPP 5G NR, legacy modulation schemes such as BPSK, π/2-BPSK, QPSK, 16-QAM, 256-QAM, 1024-QAM or in general m-QAM are used.

The average power of all the constellation points/symbols of a given modulation may be a representative of the average transmission power of the symbols. As described earlier, the constellation diagram can represent or describe these modulation schemes. In general, the power of all the constellation points/symbols of a given modulation scheme may be normalized, i.e., $E(|x|^2)=1$ where $E(\bullet)$ is the expectation operation, x is a constellation point/symbol and the expectation is taken over all the constellation points/symbols. The average power of a constellation can be computed by taking the average over the Euclidean distance of each constellation point/symbol with respect to the origin (i.e., (0,0) coordinate of the constellation diagram). Uniform modulation schemes such as m-QAM may be simple in its implementation but lack shaping gain. As an example and not by way of limitation, in a channel corrupted by an additive white Gaussian noise (AWGN), it may be more beneficial or energy efficient to transmit low-energy signals more frequently than high-energy signals, ideally with the transmission power approaching a Gaussian distribution. However, in a coded bit stream (with or without bit interleaving and/or scrambling), bit 0 and bit 1 are almost equally likely (i.e., the probability of a given bit being zero (0) or one (1) is equal to 0.5). Therefore, different constellation points/symbols may be also chosen almost equally likely. In other words, for m-QAM with m constellation points/symbols or symbols, $\log_2 m$ bits may be mapped to a single constellation point/symbol. For a given bit stream of length-N bits, the modulation process may produce a symbol stream of length-$N/\log_2 m$ and this symbol stream may contain almost equal number of symbols out of the m constellation points/symbols. Therefore, in general, for the modulation such as BPSK, π/2-BPSK, m-QAM, the transmit power may not resemble a Gaussian distribution. As such, one of the main disadvantages of legacy modulation (e.g., QAM modulation) may be the lack of shaping gain. Therefore, conventional communication systems may have a transmit power inefficiency up to the shaping loss. The maximum shaping gain may be 1.53 dB. Therefore, any modulation methods that exploit shaping gain may have a potential advantage over traditional QAM modulation scheme up to 1.53 dB.

Non-uniform constellation shaping can be used to realize the shaping gain. The following approaches may be used to perform this task. One approach is to map the uniform constellation points/symbols to non-uniform constellation points/symbols. While this approach exploits significant shaping gains, the mapping from bits to constellation points/symbols (i.e., labeling) may be non-trivial. In particular, with the presence of BICM (bit interleaved coded modulation), bit to non-uniform constellation mapping may be non-trivial and it may be a complex task. Therefore, this approach may be not suitable for practical systems with BICM. Current cellular systems such as the channel coding used in NR and LTE systems can be considered BICM based system as the transmit processing chain performs processing similarly to BICM system (e.g., bit-level processing such as scrambling and/or interleaving).

Certain methods may be used to map bits to non-uniform constellations. As an example and not by way of limitation, conventional optimization methods and the tools of AI or machine learning can be used to map bits to non-uniform constellation points/symbols, which may help obtain good shaping gains. A mapper may be designed to map a fixed-length bit sequence to non-uniform constellation points/symbols and this mapper may be optimized using a neural network.

Figure 2:
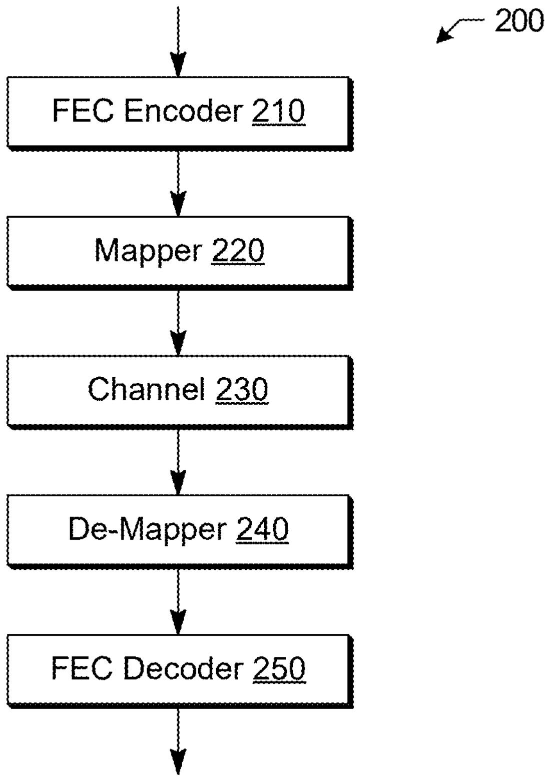
FIG. 2 illustrates an example block diagram of a communication system.

FIG. 2 illustrates an example block diagram 200 of a communication system. At the transmitter side, the information bits to be transmitted may be first passed to an FEC encoder 210 for encoding. The output of FEC encoder 210 may be mapped to constellation points/symbols using a mapper 220. After further processing including one or more of a waveform operation, symbol to resource mapping, multi-antenna processing, transform precoding (DFT-spreading), layer mapping, the generated signal may be transmitted via a channel 230. At the receiver side, a receiver may perform processing to recover the information bits transmitted from the transmitter side. A de-mapper 240 may perform signal processing on the received signal so that the FEC decoder 250 can estimate the information bits.

In some conventional systems, the mapper 220 may map bits to non-uniform constellation points/symbols where the constellation points/symbols have been obtained based on neural network-based optimization. As described earlier, in general, the mapper 220 may map the input bits to constellation points/symbols. The mapper 220 may define the constellation parameters such as labeling (Gray, anti-Gray, non-Gray), Euclidean distance (minimum distance), product distance, uniform or non-uniform constellation, mapping method such as (one-to-one mapping, one-to-many etc.), cardinality of the constellation (i.e., the alphabet size), dimensionality of the constellation (e.g., single dimension or multi-dimension, etc.). Therefore, the mapper 220 may be fundamental in any communication system and all aforementioned parameters may impact the overall performance of the communication link. As such, the architecture for mapper 220 may be non-trivial and mapper design may additionally need to consider these design parameters as well as other system parameters such as operating SNR, code rate, etc., to achieve efficient communication.

As shown in FIG. 2, the FEC encoder 210 may output an n-length codeword (i.e., coded bit stream of length n). The mapper 220 may divide the n-length codeword into multiple m-length bit sequences and each m-length bit sequence may be mapped to a constellation point/symbol. As an example and not by way of limitation, in 16-QAM, m=4 and each m bits of the coded bit stream may be mapped to a constellation point/symbol. The mapping may be legacy modulation such as NR, LTE modulation schemes, multi-dimensional modulation (i.e., direct mapping to multiple constellation points/symbols), uniform constellation or non-uniform constellation.

The stream of constellation points/symbols, after further baseband signal processing such as symbol-to-resource mapping and waveform related operations, may be transmitted over a communication channel 230 as described earlier. The communication system may be a wireless/cellular system such as LTE, NR, Wi-Fi or wired such as fiber optic, twisted pair, Ethernet cable. As such, the transmitted signal may be received at a receiver side with some channel and/or hardware related impairments such as additive noise, phase noise, quantization noise, wireless fading, and interference (e.g., inter-symbol interference, inter-user/multi-user interference, inter-carrier interference, multi-cell/inter-cell interference).

The receiver, after signal processing related to radio frequency (RF) and baseband, may de-map the received signal to bits or a soft estimate of likelihood of bits such as likely-hood ratios (LLRs). The de-mapper 240 may perform estimates of soft LLRs or other similar metrics and such estimates may be passed to the FEC decoder 250 to perform FEC decoding. One of the FEC decoder output may be the estimate of the information bits (i.e., bits input to the FEC encoder 210 at the transmitter). This disclosure describes only one of the common scenarios for brevity. However, the FEC decoder 250 or the de-mapper 240 may have different input or output than what is described herein. As such, although some common functional blocks of processing of the transmitter side and receiver side are described using FIG. 2, this disclosure contemplates any suitable description. In addition, the descriptions based on FIG. 2 should not limit the scope of the applicability of the embodiments disclosed herein.

Figure 3:
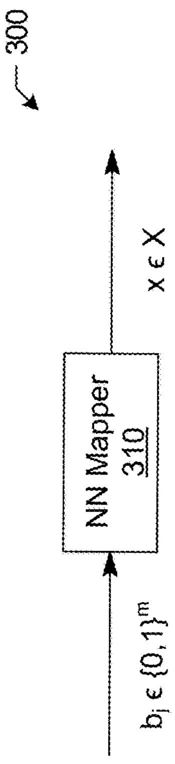
FIG. 3 illustrates an example non-uniform constellation mapping.

In some conventional systems, de-mapper 240 may use a non-uniform constellation mapping. FIG. 3 illustrates an example non-uniform constellation mapping 300. In particular, the mapper function may be implemented using a neural network based on the model shown in FIG. 3. As shown, each bit b of the input bit stream is a binary, i.e., belongs to the set 0,1 ($b \in \{0,1\}$). A neural-network (NN) mapper 310 may map a sub-sequence of bits of length m to a constellation point/symbol x which belongs to the set of all possible constellation points $\chi$ of finite size, i.e., $x \in \chi$ where the cardinality of $\chi$ is finite. The constellation points/symbols may be non-uniform.

Non-uniform constellation shaping methods that use AI or machine learning for optimization may offer significant shaping gain for medium coding rates. However, the shaping gain may be limited for low and high coding rates. The reason for this may be explained as follows. BICM without constellation shaping may be optimized to harness the advantages of both Hamming distance and Euclidian distance for coding gain. However, Euclidian distance may be redundant in some cases where some constellation points/symbols are overly protected with good coding gains (i.e., through FEC redundancy). As such, when the FEC is able to recover the errors, it may be more beneficial to use less power for those constellation points/symbols, which allows for harnessing the shaping gain. Therefore, there may be a potential to improve the shape of the constellation in BICM-based systems and achieve better energy efficiency or high spectral efficiency for a given energy/power. Consequently, such constellation may utilize the shaping gain. However, this shaping gain may be limited in high code rates as there is limited redundancy in the bits (and subsequently in the symbol domain) induced by channel coding to remove.

As described earlier, there may be many parameters that govern the performance of the modulation or constellation design, which primarily defines bits to symbol mapping. Due to the dependency on many design parameters such as bit labeling (Gray, non-Gray, etc.), Hamming distance, Euclidean distance related parameters (e.g., minimum distance and product distance), uniform/non-uniform constellation, one-to-one/one-to-many mapping, system input, and operating parameters such as operating SNR, code rate, modulation order, etc., a general architecture for modulation function (i.e., bits-to-symbol mapping function) that perform well in all operating conditions and optimized over many of the aforementioned design parameters may be challenging but fundamentally critical to improve the overall performance of the communication link.

Figure 4:
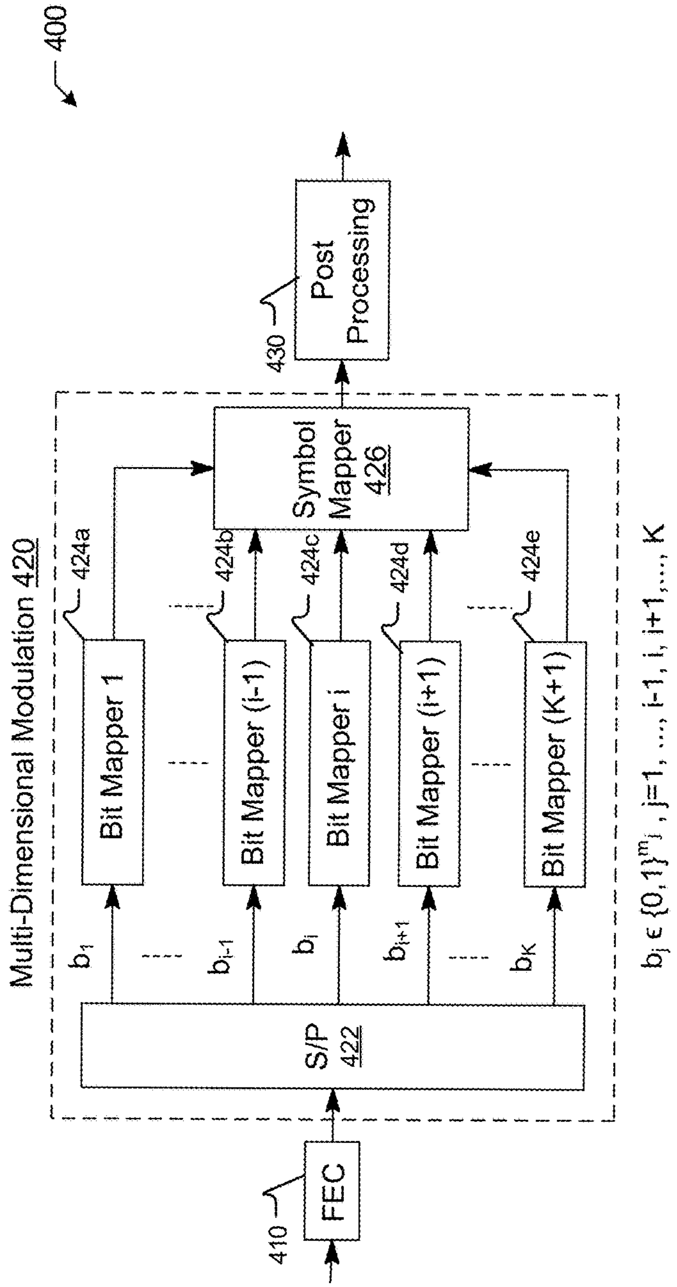
FIG. 4 illustrates an example block diagram for transmitter-side bits-to-symbol mapping.

FIG. 4 illustrates an example block diagram 400 for transmitter-side bits-to-symbol mapping. In particular embodiments, a stream of information bits $d \in \{0,1\}^p$ of length p may be inputted to a forward error correction (FEC) encoder 410. The FEC encoder 410 may output a stream of bits (commonly referred as codeword(s)) $c \in \{0,1\}^n$ of length n where $n \geq p$. When n=p, there may be no redundancy (redundancy bits) added by the FEC encoder 410, which may be known as an uncoded system. When n>p, the redundancy (redundancy bits) may be added by the FEC encoder 410, which may be known as a coded system. The ratio of p/n may be referred as code rate (r). Therefore, for a coded system, r<1 and for an uncoded system r=1. The additional bits (i.e., redundancy bits) added by the FEC encoder 410 may help the FEC decoder on the receiver side to correctly estimate the information bits transmitted by the transmitter despite various impairments including the propagation channel. The ability of correcting the errors induced by the channel impairments by the FEC encoder 410 or FEC decoder may be utilized by communication systems. Gains achieved by FEC may be referred as coding gain.

The FEC encoder 410 may generally perform channel coding. The FEC encoder 410 may also perform cyclic redundancy check (CRC) attachment, code block segmentation, per code block CRC attachment, rate matching, code block concatenation, etc. The output of the FEC encoder 410 may also be further processed through one or more bit-level processing blocks such as bit scrambling, bit interleaving, etc. The FEC codes such as LDPC, Polar, Turbo, convolution codes may be a few example encoding methods that can be applied in the FEC encoder 410.

The output of the FEC encoder 410 may be passed to a modulation block 420 of the embodiments disclosed herein. The modulation block 420 may transform the bit-input to corresponding modulation symbols. In particular embodiments, the modulation block 420 may comprise one or more bit mappers 424 in parallel followed by a symbol mapper 426 (i.e., a symbol-level combiner). Therefore, the modulation block 420 is referred as multi-dimensional modulation.

At first, n-length codeword (i.e., the output from FEC 410) may be separated into $m_j$-length ($j \in \{1, 2, \ldots K\}$) K sub-codewords/sub-streams (of bits) as shown in FIG. 4. Here, $0 \leq m_j \leq n$, i.e., each sub-codeword/sub-stream is no more than n bits in length and each sub-codeword/sub-stream is greater or equal to 0 bits in length. In particular embodiments, generating the plurality of sub-streams of coded bits may comprise dividing the accessed stream of coded bits into the plurality of sub-streams of coded bits based on a serial-to-parallel conversion. As illustrated in FIG. 4, the separation of the n-length bit stream to K sub-streams may be performed by a serial-to-parallel (S/P) block 422. The n-length codeword/bit-stream split into m-length K sub-codewords may be denoted by $b_i \in \{0,1\}^m$ $\forall i \in \{1, 2, \ldots, K\}$. In other words, each sub-codeword/sub-stream may include a stream of bits and the bit streams in different branches are labelled as $b_1, b_2, \ldots, b_K$ as shown in FIG. 4.

In particular embodiments, each of the sub-streams $b_i$ may be mapped to an intermediate symbol using the bit mapper 424. The input to the i-th bit mapper 424*c* may be the sub-stream $b_i$ and the i-th bit mapper 424*c* may output a stream of symbols corresponding to the sub-stream of input bits (one symbol for each m-bit input). The output symbols of the bit mapper 424 may be complex symbols. The sum of the lengths of sub-streams may be equal to n.

In particular embodiments, each of the bit-mapper models may be a machine-learning model trained based on minimizing an average transmission power for signals given a particular bit error rate for signal transmission. Training the machine-learning model based on minimizing an average transmission power for signals given a particular bit error rate for signal transmission may be an effective solution for addressing the technical challenge of training a machine-learning model for each of the bit mappers as the objective for training the machine-learning model aligns with the goal of improving energy efficiency in communication systems. In particular embodiments, two or more of the plurality of sub-streams may comprise different numbers of coded bits. Two or more bit-mapper models may map the two or more sub-streams comprising different numbers of coded bits to two or more intermediate symbols, respectively. In particular embodiments, two or more machine-learning models associated with the two or more bit-mappers may be based on one or more of different model architectures or different model coefficients.

Referring to FIG. 4, the length of input bits to each bit mapper 424 may be not necessarily equal. In other words, at least one output branch of S/P block 422 may have a different number of input bits compared to another branch. Allowing unequal number of bits in different branch may provide more flexibility to utilize the shaping gain of the constellation. As an example and not by way of limitation, input to bit mapper 1 424*a* may be 2 bits. Input to bit mapper 2 424*b* may be 4 bits. Accordingly, intermediate symbols outputted by bit mapper 1 424*a* and bit mapper 2 424*b* may represent 2 bits and 4 bits, respectively. The symbol mapper 426 may further output two symbols representing the input bits (i.e., 6 bits in total or 2 symbol output). As another example and not by way of limitation, there may be three bit mappers 424 and the input to each bit mapper 424 may be 2 bits. Accordingly, the intermediate symbol of each bit mapper 424 may be a symbol representing 2 bits. The symbol mapper 426 may output 3 symbols representing the input bits (6 bits in total or 3 symbol output from the three bit mappers 424). In this approach, all bit mappers 424 may be restricted to a symbol representing 2 bits, which may lead to less flexibility to utilize the shaping gain. As yet another example and not by way of limitation, each bit mapper 424 may take 3 bits. The intermediate symbols outputted from each bit mapper 424 may represent 3 bits. The bit mappers 424 may be constrained to symbols representing 3 bits. As a result, the symbol mapper 426 may be constrained to less flexibility to utilize the shaping gain. As such, having the flexibility to input unequal number of bits for each bit mapper 424 (in each S/P branch) may provide more flexibility for utilizing the shaping gain. However, for practical implementation at the transmitter side and decoding at the receiver side, the information of the transmitter structure including the number of bit mappers 424 and input bits for each bit mapper 424 may be required.

Using multiple bit mappers in parallel to process multiple streams of encoded bits followed by a symbol-level combiner may be an effective solution for addressing the technical challenge of effectively utilizing the shaping gain of constellation as the multiple bit mappers may enable the system to harness higher shaping gain for a wide range of code rates.

In particular embodiments, a legacy modulator such as BPSK, π/2-BPSK, QPSK, 16-QAM, 256-QAM, 1024-QAM or in general m-QAM may be used as bit mappers 424. As an example and not by way of limitation, a bit mapper 424 with 1 input bit may use BPSK, π/2-BPSK or two-point constellation; a bit mapper 424 with 2 input bits may use QPSK or 4-point constellation.

When lengths of input bits to the bit mappers 424 are equal, a similar bit mapper 424 may be used and parallel processing may be feasible. As an example and not by way of limitation, if each bit input is 2 bits long, QPSK may be used as the bit mapper 424. In this form of implementation, each sub-streams of bits may be equal in length, i.e., $m_j=m$, $\forall j \in \{1, 2 \ldots, K\}$ and n=mK. As an example and not by way of limitation, 2 bits may be inputted to each of three bit mappers 424. Accordingly, the intermediate symbol of outputted by each bit mapper 424 may be a symbol representing 2 bits. The symbol mapper 426 may output 3 symbols representing the input bits (6 bits in total). This approach may have less flexibility to utilize the shaping gain but may provide technical advantages of simpler implementation.

As described above, the symbol mapper 426 may receive K streams of symbols from K parallel bit mappers 424. Then the symbol mapper 426 may combine these K streams to create $\bar{K}$ symbols where $\bar{K} \geq K$. The symbol mapper 426 may be implemented differently using different embodiments.

In one embodiment, K sub-streams (of bits) may be inputted to K bit mappers 424. Each bit mapper 424 may generate a single intermediate symbol. The K intermediate symbols may be combined at the symbol mapper 426 to generate K-symbol output. As an example and not by way of limitation, K input symbols may be mapped to K output symbols by linear mapping. Specifically, K-symbol vector $x \in \mathbb{C}^{K \times 1}$ and $D \in \mathbb{C}^{K \times K}$ diagonal matrix (i.e., off-diagonal elements are zeros) and $Dx \in \mathbb{C}^{K \times 1}$ may generate the desired output of the modulation block 420. As another example and not by way of limitation, the output of each bit mapper 424 may be combined by a neural network to map to K-symbol output.

In another embodiment, K sub-streams (of bits) may be inputted to K bit mappers 424. Each bit mapper 424 may generate a single intermediate symbol. The K intermediate symbols may be combined at the symbol mapper 426 to generate $\bar{K}$-symbol output where $\bar{K}>K$. As an example and not by way of limitation, K symbols may be mapped to $\bar{K}(>K)$ symbols by linear mapping, i.e., K-symbol vector $x \in \mathbb{C}^{K \times 1}$ and $G \in \mathbb{C}^{\bar{\bar{K}} \times K}$ and $Gx \in \mathbb{C}^{\bar{\bar{K}} \times 1}$. As another example and not by way of limitation, the output of each bit mapper 424 may be combined by a neural network to map to $\bar{K}$-symbol output.

In yet another embodiment, K sub-streams (of bits) may be inputted to K bit mappers 424. Each bit mapper 424 may generate a single intermediate symbol. The K intermediate symbols may be further processed by the symbol mapper 426 to generate $\hat{K}$ symbols where $\hat{K}>K$. As an example and not by way of limitation, the $\hat{K}$ symbols may be mapped to $\bar{K}(>\hat{K})$ symbols by linear mapping, i.e., $\hat{K}$-symbol vector $x \in \mathbb{C}^{\hat{K} \times 1}$ and $G \in \mathbb{C}^{\bar{\bar{K}} \times \hat{K}}$ and $Gx \in \mathbb{C}^{\bar{\bar{K}} \times 1}$. As another example and not by way of limitation, the output of the $\hat{K}$ symbols may be combined by a neural network to map to K-symbol output where $\bar{K}>\hat{K}$.

In yet another embodiment, the bit mapper 424 may generate more than one symbol by repetition or other bit-level processing. As an example and not by way of limitation, 2 input bits $b_0b_1$ to the i-th bit mapper 424*c* may be repeated to generate $b_0b_1b_0b_1$. The bit mapper 424 may generate the symbols corresponding to each two bits. As another example and not by way of limitation, 2 input bits $b_0b_1$ to the i-th bit mapper 424*c* may be bit-level processed to generate $b_0b_1d_0d_1$ where $d_0$ and $d_1$ are functions of $b_0$, $b_1$, i.e., $d_i=f(b_0, b_1)$, i=0,1. The bit mapper 424*c* may generate the symbols corresponding to each two bits, i.e., one symbol for $b_0b_1$ and another symbol for $d_0d_1$. The function $f(a, b)$ may be bit-level processing such as bit XOR, OR, AND, etc.

In yet another embodiment, both bit-level processing and symbol-level processing may be performed to generate $\bar{K}$ symbols where $\bar{K}>K$.

In particular embodiments, the machine-learning model associated with each of the bit-mapper 424 models may comprise one or more neural networks. The bits-to-symbol mapping at K sub-streams may be performed via K neural network. Each neural network may be trained from randomly generated training data. The training may be based on minimizing average transmit power without increasing the bit error rate. In particular embodiments, a loss function based on the transmit power and a penalizing factor with error probability may be utilized during the training to optimize the coefficients in the neural network. In addition, the combining step in the symbol mapper 426 may be also performed via another neural network. The training of the neural network for symbol mapper 426 may be similar to the training of the bit-mapper 424, i.e., based on minimizing the transmit power subject to error probability constraint. In other words, the symbol-mapper 426 model may be a machine-learning model comprising one or more neural networks. Alternatively, the bit mapper 424 may be not a neural network (e.g., linear mapping or other suitable methods) while the symbol mapper 426 may be a neural network. In another alternative embodiment, the bit mapper 424 may be a neural network while the symbol mapper 426 may be not a neural network (e.g., linear mapping or other suitable methods). The output of the symbol mapper 426 may go through post processing 430. Post processing 430 may use a waveform such as CP-OFDM for multiplexing and generating the transmit signal. Post processing 430 may also use multiple antennas to transmit the signal.

Figure 5:
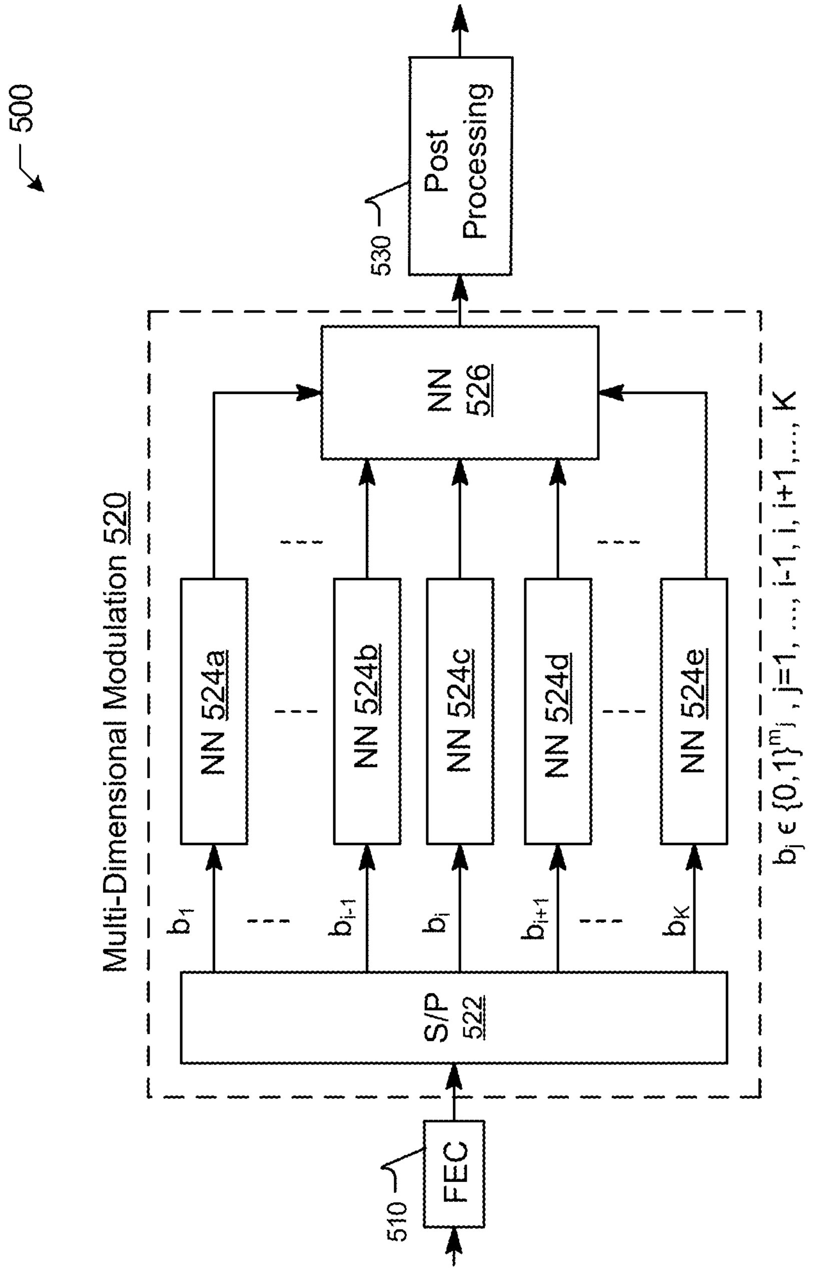
FIG. 5 illustrates an example block diagram of the transmitter-side modulation (bits-to-symbol mapping) using neural networks.

FIG. 5 illustrates an example block diagram 500 of the transmitter-side modulation (bits-to-symbol mapping) using neural networks. Similarly to the block diagram 400, the stream of information bits $d \in \{0,1\}^p$ of length p may be inputted to a forward error correction (FEC) encoder 510, after which an S/P block 522 may separate the n-length bit stream to K sub-streams. The objective of the K parallel neural networks 524, denoted by NN, may be to map the K different m-length bit sequences to K intermediate symbols. These K intermediate symbols may be then mapped to another set of $\bar{K} \geq K$ symbols for transmission using a symbol mapper 526, which is another neural network. Although it is shown as NN for all the neural networks, these neural networks may be not necessarily the same and can have different architectures. As an example and not by way of limitation, neural networks in different bit mappers 524 or symbol mapper 526 may have a varying number of input layers, output layers, hidden layers, neurons per layer, hyper parameters, learning rate and other parameters. The output of the symbol mapper 526 may go through post processing 530. Post processing 530 may use a waveform such as CP-OFDM for multiplexing and generating the transmit signal. Post processing 530 may also use multiple antennas to transmit the signal.

Figure 6:
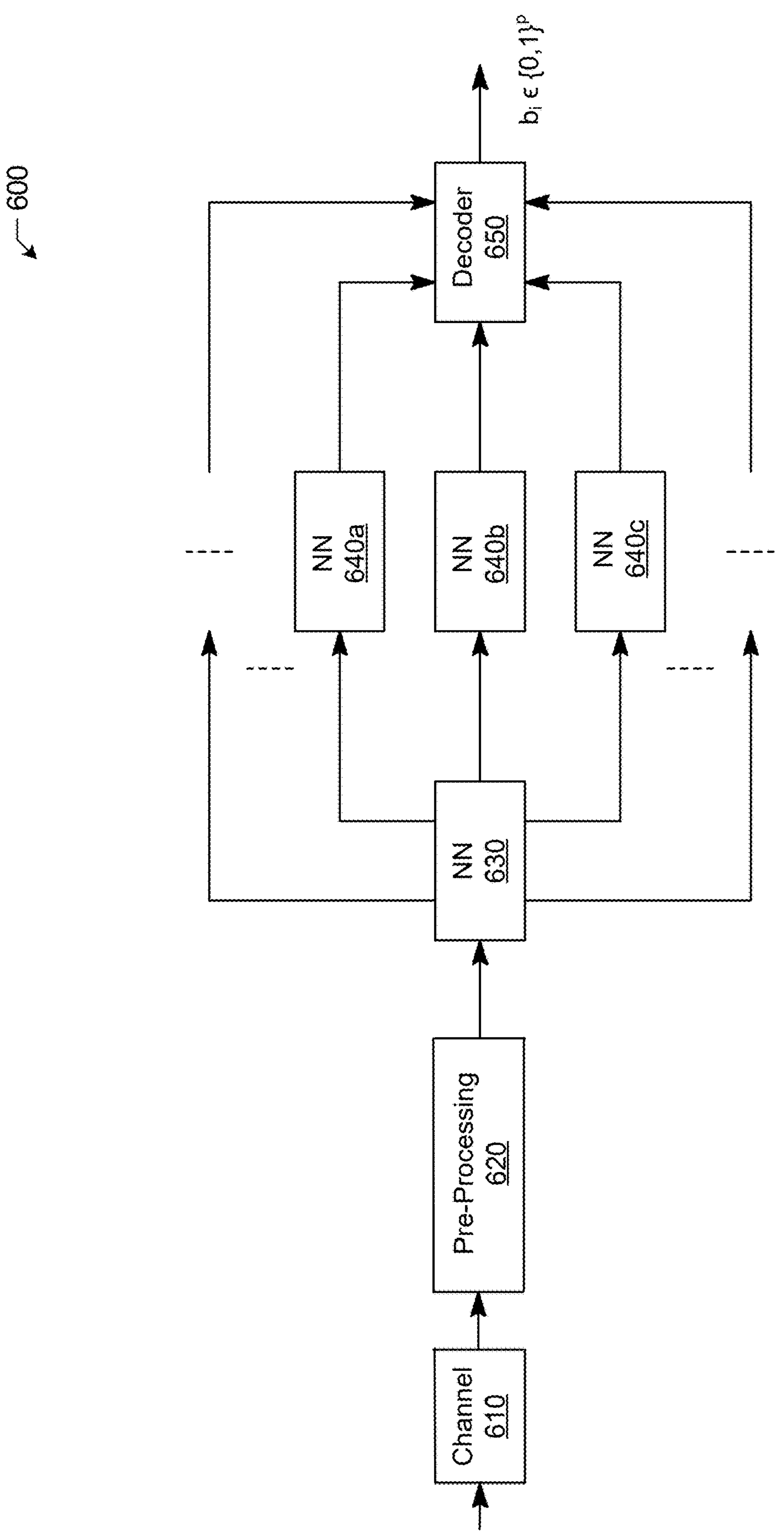
FIG. 6 illustrates an example block diagram for constellation de-mapping using neural network and decoding.

FIG. 6 illustrates an example block diagram 600 for constellation de-mapping using neural network and decoding. In particular embodiments, a receiver may perform the de-mapping operation. The receiver modulation symbols via the channel 610 (wireless or wired) may go through pre-processing 620. Pre-processing 620 may handle multiple antenna reception and waveform de-multiplexing. The output of pre-processing 620 may be processed through a first neural network 630. The input to the first neural network 630 may include a $\bar{K}$-symbol vector. The first neural network 630 may separate the $\bar{K}$ symbols into K different intermediate-symbol streams. These K intermediate-symbol streams may be parallelly processed through K neural networks 640 to generate intermediate metric of the corresponding bits (e.g., LLRs or similar metric). The decoder 650 may perform the decoding using the intermediate metric and output an estimate of the information bits. It should be noted that the input to the decoder 650 may be further processed, for example, by parallel-to-serial (P/S) conversion or truncating to values to be bounded.

For proper functioning of the embodiments disclosed herein when implemented in wireless or wired communication systems, devices or network nodes in the communication system may be configured properly and parameters may be exchanged between the devices or network nodes through signaling. As an example and not by way of limitation, for the disclosed modulation scheme to work, there may be important parameters to be specified or signaled between the transmitter and the receiver through signaling between them. In particular embodiments, the first computing system may receive, at the first computing system from the second computing system, a plurality of parameters via a signaling channel. The plurality of parameters may comprise one or more of a number of the plurality of intermediate symbols, a number of the plurality of constellation symbols, a scaling factor, a modulation and coding scheme (MCS), or a bit assignment for signaling. Accordingly, generating the signal may be further based on the plurality of parameters. Therefore, the embodiments disclosed herein may have a technical advantage of direct impact in the future wireless standard/system as well as wired communication systems as particular embodiments may adopt some parameters, configuration, methods on measurement reporting in standard for communication link configuration and smooth functioning. Without using the disclosed modulation scheme, a large performance loss may be expected.

In cellular systems, a transmission can happen in uplink, downlink, or side link. In the uplink, one or more devices may transmit to one or more base stations. In the downlink, one or more base stations may transmit to a plurality of devices. In the side link, the transmission may be from one device to another device. The transmission may happen when a device is in any radio resource control (RRC) state such RRC inactive, RRC idle, and RRC active state. The embodiments disclosed herein can be applied to a transmission in uplink, downlink or side link in wireless systems in any RRC state.

Resources to be used for a transmission may be scheduled resources where the network side may explicitly signal the resources to be used along with other parameters. As an example and not by way of limitation, such parameters may include modulation and coding scheme (MCS), code rate, modulation, transmission block size, redundancy version. A transmission may be configured or activated/triggered by signaling such as downlink control information (DCI) or uplink control information (UCI). Other signaling methods such as RRC, MAC-CE may also be used for resource configuration and/or transmission activation. The transmission or resource allocation may be periodic, aperiodic, or semi-persistent. The periodic transmission/resource allocation means that transmission may occur periodically until it is deactivated. The aperiodic transmission/resource allocation means that transmission may occur only once. Such transmission can be referred as scheduled transmission or grant-based transmission. The semi-persistent transmission/resource allocation means that transmission may occur periodically, but transmission/resource should be released after a pre-determined number of transmissions or time duration. Such transmission may be referred as configured grant transmission/resource allocation. Grant-free transmission may mean transmission without a grant where pre-specified resource can be used by the transmitter without explicitly notifying the receiver side whether such transmission occurs. A transmission may be configured or activated/triggered by signaling such as DCI/UCI, RRC, MAC-CE, etc. Transmission activation means the actual instance of starting the transmission once the resources are allocated/configured.

Along with parameters and configuration for transmission, K and $\overline{K}$ may be configured, signaled, or made available at both network side and device side. Table 1 lists example values of K.

TABLE 1

K value interpretation for bit field values.

| K | Bit assignment for signaling (B(K)) |
|---|---|
| 1 | 00 |
| 2 | 01 |
| 8 | 10 |
| 16 | 11 |

A particular bit assignment means that the corresponding K value being used by the transmitter and receiver sides. As an example and not by way of limitation, an RRC, MAC-CE or DCI signaling message contains a field for specifying K value. As another example and not by way of limitation, when the bit field specifies value '01', transmitter/receiver may be configured to use K=2 (as shown in Table 1). Table 1 is only an example and different values other than the ones shown in Table 1 for K or different length of bit fields can be used.

In Table 1, K values are captured using two bits. Once this table is specified at the transmitter and the receiver, the specific value may be chosen through two-bit signaling. Note that B(K)=00 may also include legacy modulation such as NR supported modulation schemes including BPSK, $\pi/2$-BPSK, QPSK, 16-QAM, 256-QAM, 1024-QAM or single NN based scheme.

Once K is specified in this manner, $\overline{K}$ may be specified using the following approaches. In one example approach, $\overline{K}$ may be a multiple of K such that $\overline{K}=\alpha K$. Another example approach may be to let $\overline{K}=K+\alpha$. In both cases, few values of $\alpha$ may be specified at the transmitter and the receiver, which are assigned by a bit pattern/field. Then through signaling, both transmitter and receiver may agree on one specific $\alpha$. Given transmitter or receiver knows K and $\alpha$, it may determine $\overline{K}$. It should be noted that both approaches for K may be supported, i.e., $\overline{K}=\alpha K$ and $\overline{K}=K+\alpha$. Which approach being applied may be signaled or implicitly known by the specification or values being used.

TABLE 2

An example for a corresponding to each K value.

| K | Bit assignment for signaling (B($\alpha$)) | $\alpha$ |
|---|---|---|
| 1 | 0 | 1 |
| | 1 | 2 |
| 2 | 0 | 2 |
| | 1 | 4 |
| 8 | 0 | 4 |
| | 1 | 8 |
| 16 | 0 | 4 |
| | 1 | 8 |

As shown in Table 2, for each value of K, the value of $\alpha$ can be signaled through a bit field B($\alpha$). For example, B(K) field '01' means that K=2. B($\alpha$) field 0 means $\alpha$=1 is configured while B($\alpha$) field 1 means $\alpha$=2 is configured. As shown in Table 2, a limited number of a may be supported for each K value (e.g., two different values of $\alpha$ for each K in Table 2). An additional one-bit signaling may be used to indicate the choice of $\alpha$ for a given K. For different K values, different number of $\alpha$ values may be supported with different overhead for signaling. It should be noted that Table 1 and Table 2 may be used to interpret the bit-field values to obtain the values for K and $\alpha$. Instead of two separate bit fields, one-bit field may be used. For example, two bits of K value may be signaled by the most significant bits of the bit field and the $\alpha$ value may be signaled by the least significant bits of the bit field. For example, indication of bit-field value '101' may be interpreted as K=8 (K value corresponds to MSB bits value '10' from Table 1) and $\alpha$=8 ($\alpha$ value correspond to LSB bit value '1' from Table 2). Alternatively, MSB bits may indicate $\alpha$ value and LSB may indicate K value. Note that $\overline{K}$ indication is similar to indicating $\alpha$ as the relationship of $\overline{K}$ to $\alpha$ may be known by specification or by signaling. Instead of signaling $\alpha$, a similar table may be specified for $\overline{K}$. It should also be noted that without multiple choices specified by one or more tables, the values of K, $\overline{K}$ or $\alpha$ may be specified for transmission or usage scenarios. It should be noted that multiple tables for K, $\overline{K}$ or $\alpha$ may be specified. Which table or values to be used may be signaled or specified by the usage scenario or through signaling.

Figure 7:
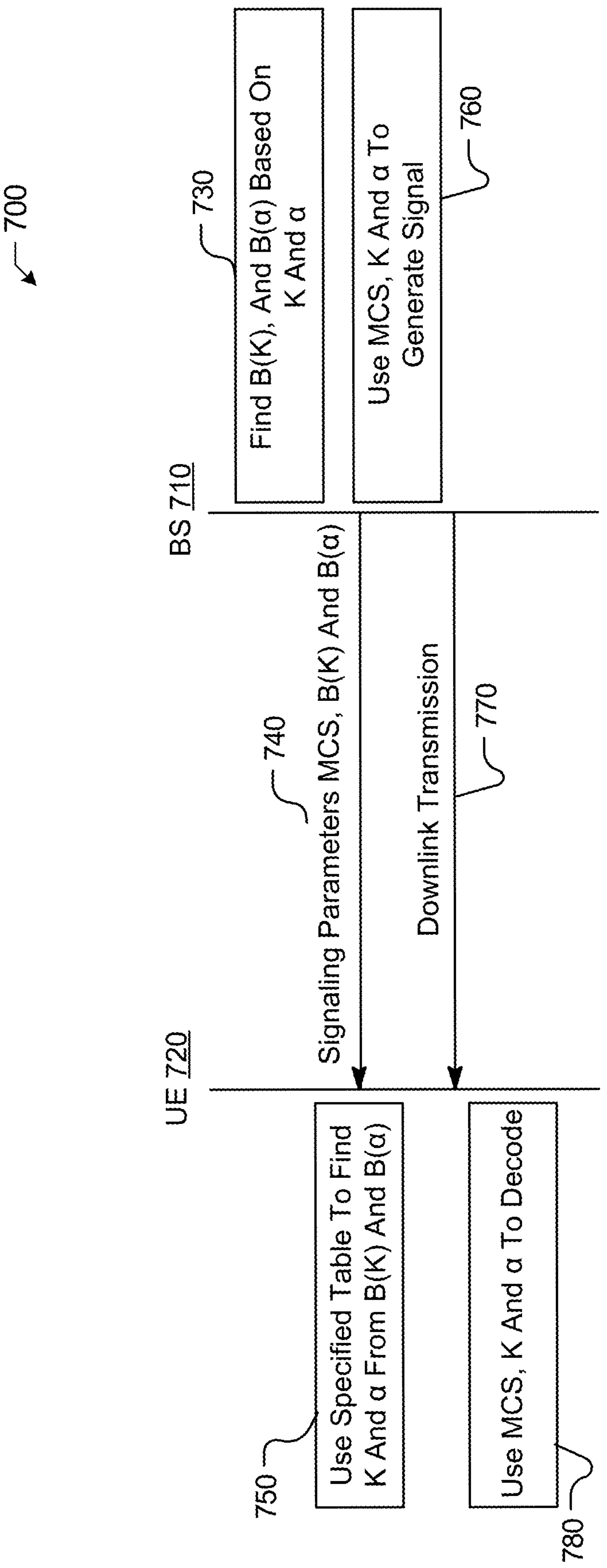
FIG. 7 illustrates an example downlink signaling diagram.

Let the signaling for K and $\alpha$ be denoted by B(K) and B($\alpha$), respectively. As described earlier, $\overline{K}$ indication may be similar to indicating $\alpha$ as the relationship of $\overline{K}$ to $\alpha$ may be known by specification or by signaling. FIG. 7 illustrates an example downlink signaling diagram 700. Note that for downlink, the transmitter may be the base station (BS) 710 or network side and the user equipment (UE) 720 may be the receiver side.

As shown in FIG. 7, at step 730, base-station (BS) 710 may determine the values to be used for K or $\alpha$ or both (equivalently $\overline{K}$) and determine the B(K) and B($\alpha$) to be signaled. The determination of values for K or $\alpha$ may be based on MCS value (modulation/coding), TBS, measurement reports received from the device side 720 or measurements made by the network side 710. The measurements may be obtained by the network side 710 or device side 720 by one or more reference signals such as channel state information reference signal (CSI-RS), sounding reference signal (SRS), demodulation reference signal (DMRS), phase tracking reference signal (PTRS) or others. Measurements may also be made by using the data transmission decoding/detection or other signals such preamble, system synchronization block (SSB) including primary synchronization signal (PSS), secondary synchronization signal (SSS).

In one scenario, the device side 720 may report one or more possible K or $\alpha$ values and the network side 710 may determine the suitable combination for transmission (e.g., explicit signaling from UE 720 to BS 710 (not shown in FIG. 7)). In another scenario, implicit measurements may be reported and the network side 710 may determine the K or $\alpha$ values to be used.

In downlink transmission, these parameters may be signaled to the UE 720 at step 740 as shown in FIG. 7. The signaling may be implicit or explicit as described earlier. For example, one or more fields in the signaling message may explicitly indicate the values to be used along with one or more other parameters such MCS (modulation/coding rate), resource allocation, transmission type (grant-free, configured-grant, scheduled-transmission, or grant-based), etc. As another example, one or more fields in the signaling message may indicate indirectly such as derived or mapping the values to be used for K or $\alpha$ along with one or more other parameters such MCS (modulation/coding rate), resource allocation, transmission type (grant-free, configured-grant, scheduled-transmission, or grant-based), etc.

At step 750, the UE 720 may use specified table to find K and α from B(K) and B(α). For example, the parameters K or α may be derived or obtained from MCS index where MCS index to K or α is specified in a table or as a function. All these explicit, implicit, direct, or indirect and other methods of informing K or α are denoted by B(K) and B(α) in FIG. 7.

At step 760, the BS may use MCS, the K and α values along with other agreed parameters and configurations to generate a downlink signal. At step 770, the BS may transmit the generated signal via downlink transmission. The downlink transmission may happen while the UE 720 is in any RRC state such as RRC inactive, connected or idle as well as in any transmission scenario such as grant-free, configured-grant, scheduled-transmission, grant-based or others. After receiving the values to be used for K or α by B(K) and B(α), at step 780, the UE 720 may use the received downlink transmission and information on K or α for demodulation and/or decoding to obtain an estimate of the information bits intended to be transmitted from the transmitter (BS 710). Alternatively, the UE 720 may blindly estimate the K or α and use those estimated values for demodulation.

After decoding/demodulation, the UE 720 may perform measurements based on the received downlink transmission and/or other reference signals such as DMRS, PTRS, CSI-RS. The UE 720 may report such measured information back to the BS 710 (not shown in FIG. 7). Further, the UE 720 may calculate/determine the best suitable K or α or both and may inform to the BS 710 via uplink signaling (not shown in FIG. 7) such as UCI, RRC, MAC-CE or others.

Figure 8:
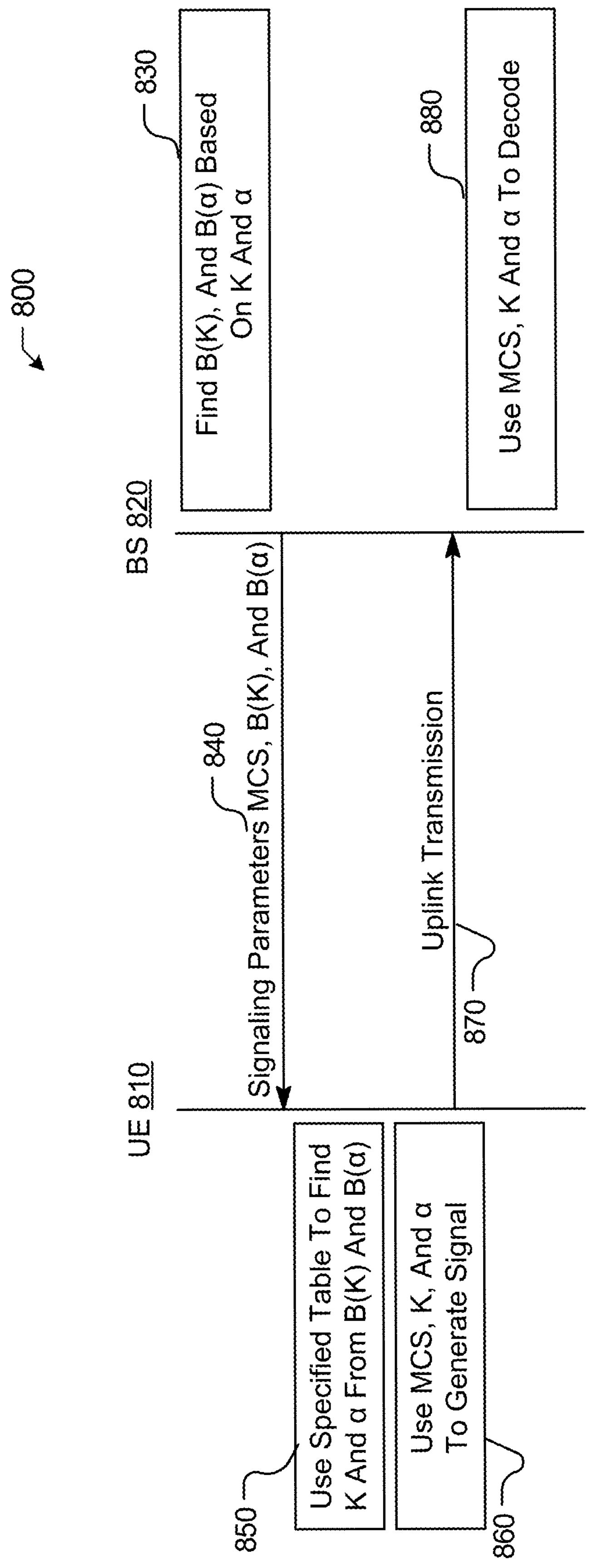
FIG. 8 illustrates an example uplink signaling diagram.

FIG. 8 illustrates an example uplink signaling diagram 800. For uplink, the transmitter may be the UE 810 and the BS/network side 820 may be the receiver. At step 830, the BS may determine B(K) and B(α) based on K and α. The BS 820 may determine the values to be used for K or α or both (equivalently $\overline{K}$). The determination of values for K or α may be based on MCS value (modulation/coding), TBS, measurement reports received from the device side 810 or measurements made by the network side 820. Measurements can be obtained by the network side 820 or device side 810 by reference signals such as channel state information reference signal (CSI-RS), sounding reference signal (SRS), demodulation reference signal (DMRS), phase tracking reference signal (PTRS) or others. Measurements may also be made by using the data transmission decoding/detection or other signals such preamble, system synchronization block (SSB) including primary synchronization signal (PSS), secondary synchronization signal (SSS).

In one example scenario, the UE 810 may report one or more possible K or α values and the BS may determine the suitable combination for transmission (i.e., explicit signaling from the UE 810 to BS 820 (not shown in FIG. 8)). In another example scenario, implicit measurements may be reported, and the BS 820 may determine the K or α values to be used.

In uplink transmission, these parameters are signaled to the UE 810 at step 840 as shown in FIG. 8. The signaling may be implicit or explicit as described earlier. For example, one or more fields in the signaling message may indicate explicitly the values to be used along with one or more other parameters such MCS (modulation/coding rate), resource allocation, transmission type (grant-free, configured-grant, scheduled-transmission, or grant-based), etc. As another example, one or more fields in the signaling message may indicate indirectly such as derived or mapping the values to be used for K or α along with one or more other parameters such MCS (modulation/coding rate), resource allocation, transmission type (grant-free, configured-grant, scheduled-transmission, or grant-based), etc.

At step 850, the UE 810 may use a specified table to find K and α from B(K) and B(α). For example, the parameters K or α may be derived/obtained from MCS index where MCS index to K or α is specified in a table or as a function. All these explicit, implicit, direct, or indirect and other methods of informing K or α is denoted by B(K) and B(α) in FIG. 8.

In uplink transmission, after obtaining the values for K or α or both by B(K) and B(α) or other methods along with other parameters, the UE 810 may generate the signal at step 860. The UE 810 may further transmit the signal to the BS 820 via uplink transmission at step 870. The uplink transmission may happen while the UE 810 is in any RRC state such as RRC inactive, connected or idle as well as any transmission scenario such as grant-free, configured-grant, scheduled-transmission, grant-based or others.

At step 880, the BS 820 may use the agreed K or α or both for demodulation and/or decoding to obtain an estimate of the information bits intended to be transmitted from the UE 810. Optionally, the UE 810 may use the K or α or both different from what is signaled from the BS 820 and the BS 820 may estimate the values used by the UE 810 or perform blind decoding. The UE 810 may optionally inform the K or α or both to the BS 820 using B(K) and B(α) or other signaling methods described earlier.

After decoding/demodulation, the BS 820 may perform measurements based on the received uplink transmission and/or other reference signals such as DMRS, PTRS, SRS. The BS 820 may report such measured information back to the UE 810 or adjust the parameter values to be used in subsequent transmissions (not shown in FIG. 8). The UE 810 may further calculate/determine the most suitable K or α or both and communicate them to the BS 820 via downlink signaling (not shown in FIG. 8) such as DCI, RRC, MAC-CE or others.

Figure 9:
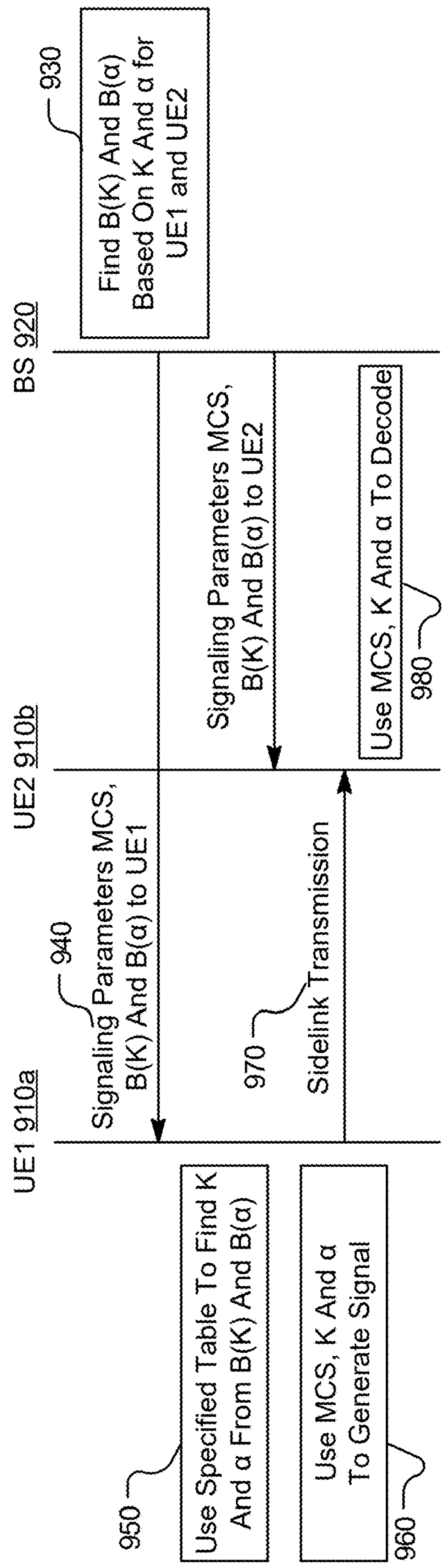
FIG. 9 illustrates an example side link signaling diagram.

FIG. 9 illustrates an example side link signaling diagram 900. For side link, the transmission may be from one device (e.g., UE 910*a*) to another device (e.g., UE 910*b*). As shown in FIG. 9, at step 930, the base station (BS) 920 may determine B(K) and B(α) based on K and α for UE 910*a* and UE 910*b*. BS 920 may determine the values to be used for K or α or both (equivalently $\overline{K}$). The determination of values for K or α may be based on MCS value (modulation/coding), TBS, measurement reports received from the device side 910 or measurements made by the network side 920. Measurements can be obtained by the network side 920 or device side 910 by reference signals such as channel state information reference signal (CSI-RS), sounding reference signal (SRS), demodulation reference signal (DMRS), phase tracking reference signal (PTRS) or other reference signal between devices. Measurements may also be made by using data transmission decoding/detection or other signals such preamble, system synchronization block (SSB) including primary synchronization signal (PSS), secondary synchronization signal (SSS).

In one example scenario, device side 910 may report one or more possible K or α values and network side 920 may determine the suitable combination for the transmission based on the measurements of the side link (e.g., explicit signaling from UE 910 to BS 920 (not shown in FIG. 9)). In another example scenario, implicit measurements may be reported and the BS 920 may determine the K or α values to be used. In side link transmission, these parameters may be signaled to the UE 910 at step 940 as shown in FIG. 9. The signaling can be implicit or explicit as described earlier.

For example, one or more fields in the signaling message may indicate explicitly the values to be used along with one or more other parameters such MCS (modulation/coding rate), resource allocation, transmission type (grant-free, configured-grant, scheduled-transmission, or grant-based), etc. As another example, one or more fields in the signaling message may indicate indirectly such as derived or mapping the values to be used for K or $\alpha$ along with one or more other parameters such MCS (modulation/coding rate), resource allocation, transmission type (grant-free, configured-grant, scheduled-transmission, or grant-based), etc.

At step 950, UE 910 may use a specified table to find K and $\alpha$ from B(K) and B($\alpha$). For example, the parameters K or $\alpha$ may be derived from MCS index where MCS index to K or $\alpha$ is specified in a table or as a function. All these explicit, implicit, direct, or indirect and other methods of informing K or $\alpha$ is denoted by B(K) and B($\alpha$) in FIG. 9.

In side link transmission, after obtaining the values for K or $\alpha$ or both by B(K) and B($\alpha$) or other signaling methods along with other parameters or configurations, UE 910*a* may generates the signal at step 960. At step 970, UE 910*a* may transmit the signal to UE 910*b*, which is shown as side link transmission in FIG. 9. The transmission may happen while one or both UE(s) 910 are in any RRC state such as RRC inactive, connected or idle as well as any transmission scenario such as grant-free, configured-grant, scheduled-transmission, grant-based or others. At step 980, UE 910*b* may use the agreed K or $\alpha$ or both for demodulation and/or decoding to obtain an estimate of the information bits intended to be transmitted from UE 910*a*. Optionally, UE 910 may use the K or $\alpha$ or both different from what is signaled from BS 920 and UE 910*b* may estimate the values used by UE 910*a* or perform blind decoding. UE 910*a* may optionally inform the K or a or both to UE 910*b* and BS 920 using B(K) and B($\alpha$) or other signaling methods described earlier.

After decoding/demodulation, UE 910*b* may perform measurements based on the received uplink transmission and/or other reference signals such as DMRS, PTRS, SRS. UE 910*b* may report such measured information back to UE 910*a* or BS 920 or adjust the parameter values to be used in subsequent transmissions (not shown in FIG. 9). BS 920 may further calculate/determine the most suitable K or $\alpha$ or both and communicate them to UE 910*a* via side link signaling (not shown in FIG. 9). UE 910*b* may further calculate/determine the most suitable K or $\alpha$ or both and may inform to BS 920 via side link signaling (not shown in FIG. 9).

In particular embodiments, an alternative way to specify the parameters K and $\bar{K}$ may be as follows. MCS parameters may be defined in a table. For different MCS parameters, the computing system may find the optimized K and $\bar{K}$ parameters. Therefore, the K and $\bar{K}$ parameters may be included as new parameters in the MCS table. For a chosen MCS, the K and $\bar{K}$ parameters may be found using the MCS table.

Figure 10:
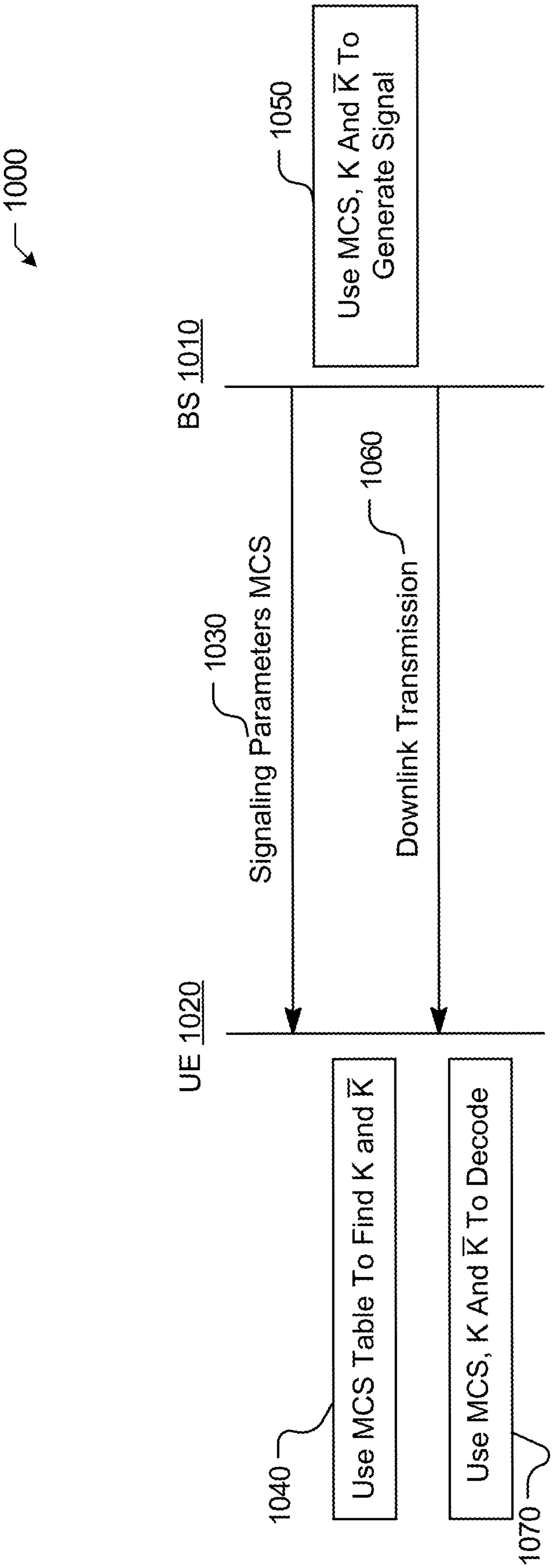
FIG. 10 illustrates another example downlink signaling diagram.

FIG. 10 illustrates another example downlink signaling diagram 1000. At step 1030, BE 1010 may signal parameters of MCS to UE 1020. At step 1040, UE 1020 may use an MCS table to find K and $\bar{K}$. At step 1050, BS 1010 may use MCS, K and $\bar{K}$ to generate a signal. At step 1060, BS 1010 may transmit the signal to UE 1020 via downlink transmission. At step 1070, UE 1020 may use MCS, K and $\bar{K}$ to decode the signal. As described earlier, different signaling or measurements can be used.

Figure 11:
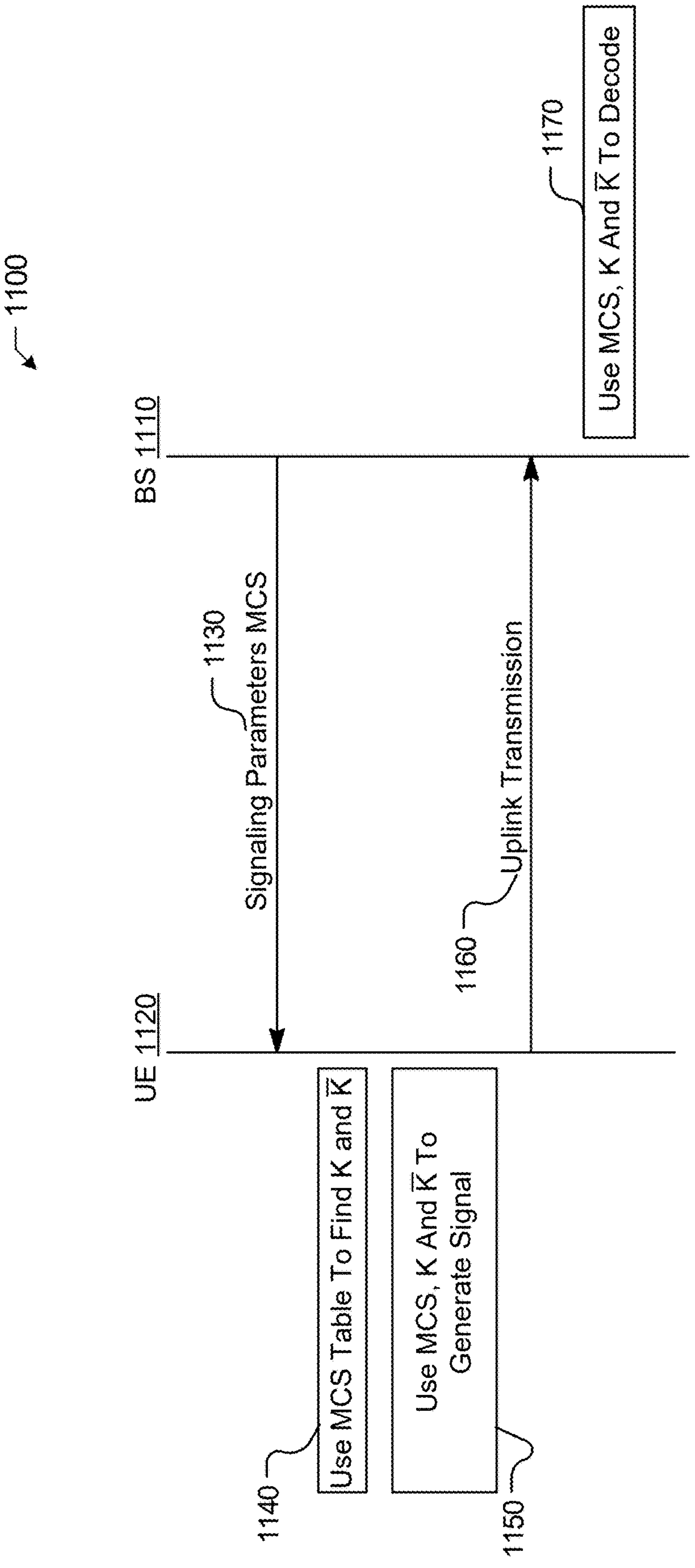
FIG. 11 illustrates another example uplink signaling diagram.

FIG. 11 illustrates another example uplink signaling diagram 1100. At step 1130, BS 1110 may signal parameters of MCS to UE 1120. At step 1140, UE 1120 may use an MCS table to find K and $\bar{K}$. At step 1150, UE 1120 may use MCS, K and $\bar{K}$ to generate a signal. At step 1160, UE 1120 may transmit the signal to BS 1110 via uplink transmission. At step 1170, BS 1110 may use MCS, K and $\bar{K}$ to decode the signal. As described earlier, different signaling or measurements can be used.

Figure 12:
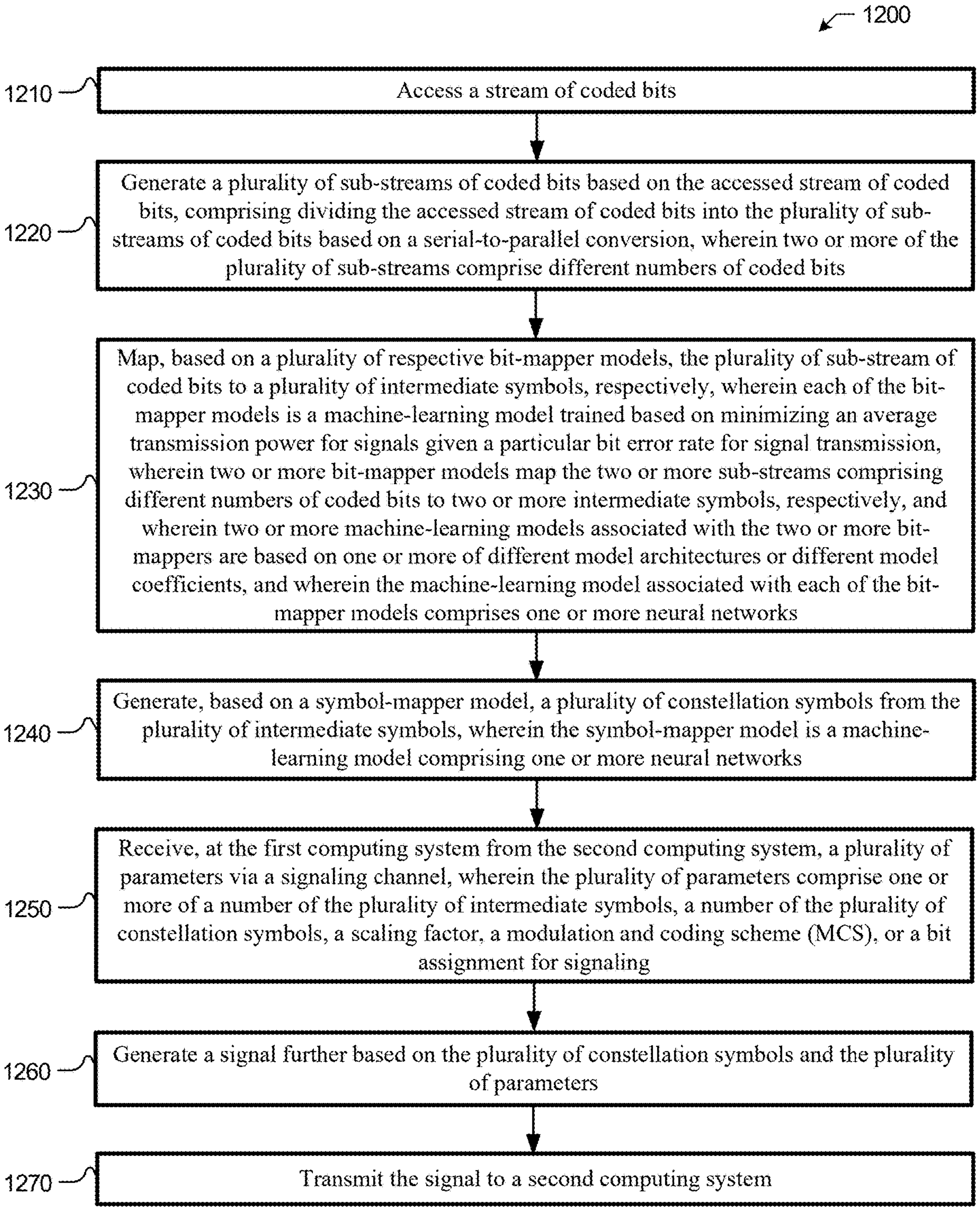
FIG. 12 illustrates is a flow diagram of a method for AI-based multi-dimensional modulation shaping, in accordance with the presently disclosed embodiments.

FIG. 12 illustrates is a flow diagram of a method 1200 for AI-based multi-dimensional modulation shaping, in accordance with the presently disclosed embodiments. The method 1200 may be performed utilizing one or more processing devices (e.g., a first computing system) that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), or any other processing device(s) that may be suitable for processing wireless communication data, software (e.g., instructions running/executing on one or more processors), firmware (e.g., microcode), or some combination thereof.

The method 1200 may begin at step 1210 with the one or more processing devices (e.g., the first computing system). For example, in particular embodiments, the first computing system may access a stream of coded bits. The method 1200 may then continue at step 1220 with the one or more processing devices (e.g., the first computing system). For example, in particular embodiments, the first computing system may generate a plurality of sub-streams of coded bits based on the accessed stream of coded bits, comprising dividing the accessed stream of coded bits into the plurality of sub-streams of coded bits based on a serial-to-parallel conversion, wherein two or more of the plurality of sub-streams comprise different numbers of coded bits. The method 1200 may then continue at step 1230 with the one or more processing devices (e.g., the first computing system). For example, in particular embodiments, the first computing system may map, based on a plurality of respective bit-mapper models, the plurality of sub-stream of coded bits to a plurality of intermediate symbols, respectively, wherein each of the bit-mapper models is a machine-learning model trained based on minimizing an average transmission power for signals given a particular bit error rate for signal transmission, wherein two or more bit-mapper models map the two or more sub-streams comprising different numbers of coded bits to two or more intermediate symbols, respectively, and wherein two or more machine-learning models associated with the two or more bit-mappers are based on one or more of different model architectures or different model coefficients, and wherein the machine-learning model associated with each of the bit-mapper models comprises one or more neural networks. The method 1200 may then continue at step 1240 with the one or more processing devices (e.g., the first computing system). For example, in particular embodiments, the first computing system may generate, based on a symbol-mapper model, a plurality of constellation symbols from the plurality of intermediate symbols, wherein the symbol-mapper model is a machine-learning model comprising one or more neural networks. The method 1200 may then continue at step 1250 with the one or more processing devices (e.g., the first computing system). For example, in particular embodiments, the first computing system may receive, at the first computing system from the second computing, a plurality of parameters via a signaling channel, wherein the plurality of parameters comprise one or more of a number of the plurality of intermediate symbols, a number of the plurality of constellation symbols, a scaling factor, a modulation and coding scheme (MCS), or a bit assignment for signaling. The method 1200 may then continue at step 1260 with the one or more processing devices (e.g., the first computing system). For example, in particular embodiments, the first computing system may generate a signal further based on the plurality of constellation symbols and the plurality of parameters. The method 1200 may then continue at step 1270 with the one or more processing devices (e.g., the first computing system). For example, in particular embodiments, the first computing system may transmit the signal to a second computing system. Particular embodiments may repeat one or more steps of the method of FIG. 12, where appropriate. Although this disclosure describes and illustrates particular steps of the method of FIG. 12 as occurring in a particular order, this disclosure contemplates any suitable steps of the method of FIG. 12 occurring in any suitable order. Moreover, although this disclosure describes and illustrates an example method for AI-based multi-dimensional modulation shaping including the particular steps of the method of FIG. 12, this disclosure contemplates any suitable method for AI-based multi-dimensional modulation shaping including any suitable steps, which may include all, some, or none of the steps of the method of FIG. 12, where appropriate. Furthermore, although this disclosure describes and illustrates particular components, devices, or systems carrying out particular steps of the method of FIG. 12, this disclosure contemplates any suitable combination of any suitable components, devices, or systems carrying out any suitable steps of the method of FIG. 12.

Systems and Methods

Figure 13:
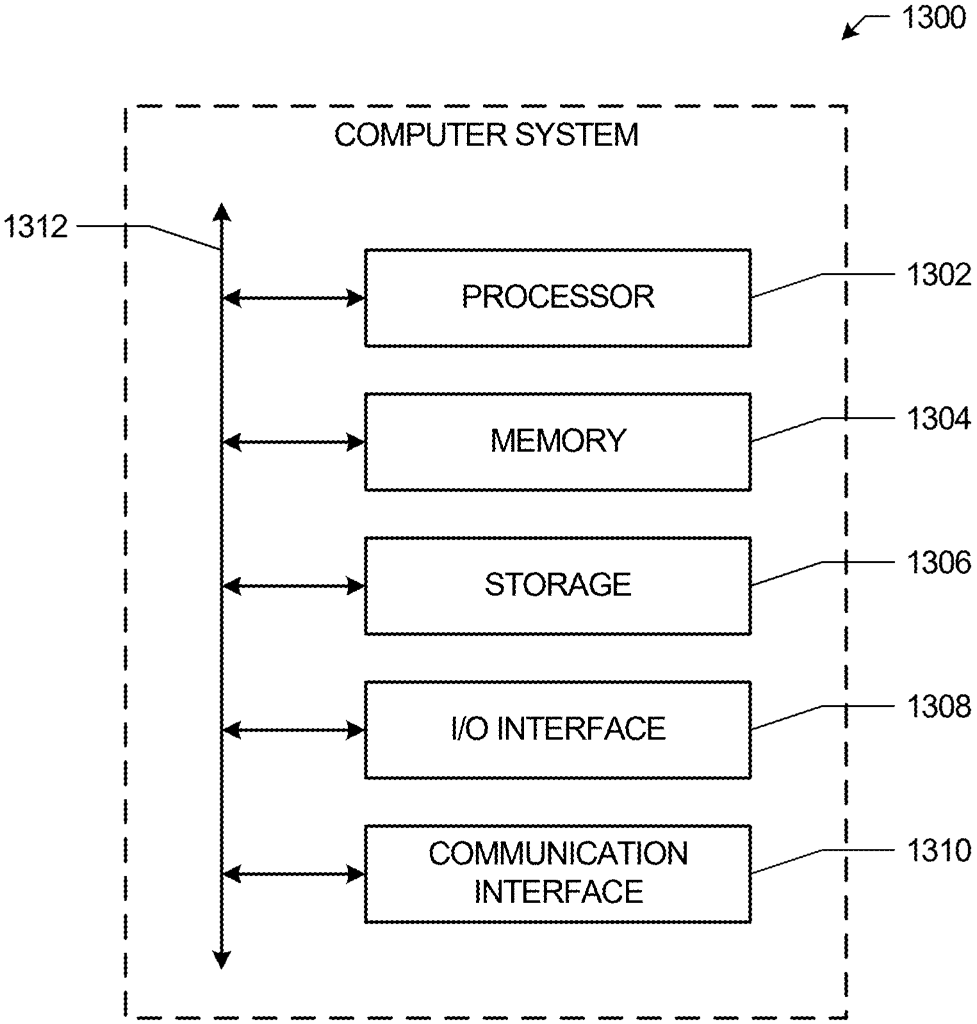
FIG. 13 illustrates an example computer system that may be utilized for AI-based multi-dimensional modulation shaping, in accordance with the presently disclosed embodiments.

FIG. 13 illustrates an example computer system 1300 that may be utilized for AI-based multi-dimensional modulation shaping, in accordance with the presently disclosed embodiments. In particular embodiments, one or more computer systems 1300 perform one or more steps of one or more methods described or illustrated herein. In particular embodiments, one or more computer systems 1300 provide functionality described or illustrated herein. In particular embodiments, software running on one or more computer systems 1300 performs one or more steps of one or more methods described or illustrated herein or provides functionality described or illustrated herein. Particular embodiments include one or more portions of one or more computer systems 1300. Herein, reference to a computer system may encompass a computing device, and vice versa, where appropriate. Moreover, reference to a computer system may encompass one or more computer systems, where appropriate.

This disclosure contemplates any suitable number of computer systems 1300. This disclosure contemplates computer system 1300 taking any suitable physical form. As example and not by way of limitation, computer system 1300 may be an embedded computer system, a system-on-chip (SOC), a single-board computer system (SBC) (e.g., a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1300 may include one or more computer systems 1300; be unitary or distributed; span multiple locations; span multiple machines; span multiple data centers; or reside in a cloud, which may include one or more cloud components in one or more networks.

Where appropriate, one or more computer systems 1300 may perform without substantial spatial or temporal limitation one or more steps of one or more methods described or illustrated herein. As an example, and not by way of limitation, one or more computer systems 1300 may perform in real time or in batch mode one or more steps of one or more methods described or illustrated herein. One or more computer systems 1300 may perform at different times or at different locations one or more steps of one or more methods described or illustrated herein, where appropriate.

In particular embodiments, computer system 1300 includes a processor 1302, memory 1304, storage 1306, an input/output (I/O) interface 1308, a communication interface 1310, and a bus 1312. Although this disclosure describes and illustrates a particular computer system having a particular number of particular components in a particular arrangement, this disclosure contemplates any suitable computer system having any suitable number of any suitable components in any suitable arrangement. In particular embodiments, processor 1302 includes hardware for executing instructions, such as those making up a computer program. As an example, and not by way of limitation, to execute instructions, processor 1302 may retrieve (or fetch) the instructions from an internal register, an internal cache, memory 1304, or storage 1306; decode and execute them; and then write one or more results to an internal register, an internal cache, memory 1304, or storage 1306. In particular embodiments, processor 1302 may include one or more internal caches for data, instructions, or addresses. This disclosure contemplates processor 1302 including any suitable number of any suitable internal caches, where appropriate. As an example, and not by way of limitation, processor 1302 may include one or more instruction caches, one or more data caches, and one or more translation lookaside buffers (TLBs). Instructions in the instruction caches may be copies of instructions in memory 1304 or storage 1306, and the instruction caches may speed up retrieval of those instructions by processor 1302.

Data in the data caches may be copies of data in memory 1304 or storage 1306 for instructions executing at processor 1302 to operate on; the results of previous instructions executed at processor 1302 for access by subsequent instructions executing at processor 1302 or for writing to memory 1304 or storage 1306; or other suitable data. The data caches may speed up read or write operations by processor 1302. The TLBs may speed up virtual-address translation for processor 1302. In particular embodiments, processor 1302 may include one or more internal registers for data, instructions, or addresses. This disclosure contemplates processor 1302 including any suitable number of any suitable internal registers, where appropriate. Where appropriate, processor 1302 may include one or more arithmetic logic units (ALUs); be a multi-core processor; or include one or more processors 1302. Although this disclosure describes and illustrates a particular processor, this disclosure contemplates any suitable processor.

In particular embodiments, memory 1304 includes main memory for storing instructions for processor 1302 to execute or data for processor 1302 to operate on. As an example, and not by way of limitation, computer system 1300 may load instructions from storage 1306 or another source (such as, for example, another computer system 1300) to memory 1304. Processor 1302 may then load the instructions from memory 1304 to an internal register or internal cache. To execute the instructions, processor 1302 may retrieve the instructions from the internal register or internal cache and decode them. During or after execution of the instructions, processor 1302 may write one or more results (which may be intermediate or final results) to the internal register or internal cache. Processor 1302 may then write one or more of those results to memory 1304. In particular embodiments, processor 1302 executes only instructions in one or more internal registers or internal caches or in memory 1304 (as opposed to storage 1306 or elsewhere) and operates only on data in one or more internal registers or internal caches or in memory 1304 (as opposed to storage 1306 or elsewhere).

One or more memory buses (which may each include an address bus and a data bus) may couple processor 1302 to memory 1304. Bus 1312 may include one or more memory buses, as described below. In particular embodiments, one or more memory management units (MMUs) reside between processor 1302 and memory 1304 and facilitate accesses to memory 1304 requested by processor 1302. In particular embodiments, memory 1304 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1304 may include one or more memory devices, where appropriate. Although this disclosure describes and illustrates particular memory, this disclosure contemplates any suitable memory.

In particular embodiments, storage 1306 includes mass storage for data or instructions. As an example, and not by way of limitation, storage 1306 may include a hard disk drive (HDD), a floppy disk drive, flash memory, an optical disc, a magneto-optical disc, magnetic tape, or a Universal Serial Bus (USB) drive or a combination of two or more of these. Storage 1306 may include removable or non-removable (or fixed) media, where appropriate. Storage 1306 may be internal or external to computer system 1300, where appropriate. In particular embodiments, storage 1306 is non-volatile, solid-state memory. In particular embodiments, storage 1306 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1306 taking any suitable physical form. Storage 1306 may include one or more storage control units facilitating communication between processor 1302 and storage 1306, where appropriate. Where appropriate, storage 1306 may include one or more storages 1306. Although this disclosure describes and illustrates particular storage, this disclosure contemplates any suitable storage.

In particular embodiments, I/O interface 1308 includes hardware, software, or both, providing one or more interfaces for communication between computer system 1300 and one or more I/O devices. Computer system 1300 may include one or more of these I/O devices, where appropriate. One or more of these I/O devices may enable communication between a person and computer system 1300. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1308 for them. Where appropriate, I/O interface 1308 may include one or more device or software drivers enabling processor 1302 to drive one or more of these I/O devices. I/O interface 1308 may include one or more I/O interfaces 1308, where appropriate. Although this disclosure describes and illustrates a particular I/O interface, this disclosure contemplates any suitable I/O interface.

In particular embodiments, communication interface 1310 includes hardware, software, or both providing one or more interfaces for communication (such as, for example, packet-based communication) between computer system 1300 and one or more other computer systems 1300 or one or more networks. As an example, and not by way of limitation, communication interface 1310 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1310 for it.

As an example, and not by way of limitation, computer system 1300 may communicate with an ad hoc network, a personal area network (PAN), a local area network (LAN), a wide area network (WAN), a metropolitan area network (MAN), an ultra-wideband network (UWB), or one or more portions of the Internet or a combination of two or more of these. One or more portions of one or more of these networks may be wired or wireless. As an example, computer system 1300 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1300 may include any suitable communication interface 1310 for any of these networks, where appropriate. Communication interface 1310 may include one or more communication interfaces 1310, where appropriate. Although this disclosure describes and illustrates a particular communication interface, this disclosure contemplates any suitable communication interface.

In particular embodiments, bus 1312 includes hardware, software, or both coupling components of computer system 1300 to each other. As an example, and not by way of limitation, bus 1312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1312 may include one or more buses 1312, where appropriate. Although this disclosure describes and illustrates a particular bus, this disclosure contemplates any suitable bus or interconnect.

Miscellaneous

Herein, “or” is inclusive and not exclusive, unless expressly indicated otherwise or indicated otherwise by context. Therefore, herein, “A or B” means “A, B, or both,” unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Herein, "automatically" and its derivatives means "without human intervention," unless expressly indicated otherwise or indicated otherwise by context.

The embodiments disclosed herein are only examples, and the scope of this disclosure is not limited to them. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a first computing system:

accessing a stream of coded bits;

generating a plurality of sub-streams of coded bits based on the accessed stream of coded bits;

mapping, based on a plurality of respective bit-mapper models, the plurality of sub-stream of coded bits to a plurality of intermediate symbols, respectively, wherein each of the bit-mapper models is a machine-learning model trained using a loss function configured to minimize an average transmission power for signals subject to a particular bit error rate for signal transmission;

generating, based on a symbol-mapper model, a plurality of constellation symbols from the plurality of intermediate symbols; and transmitting a signal generated based on the plurality of constellation symbols to a second computing system.

2. The method of claim 1, wherein the machine-learning model associated with each of the bit-mapper models comprises one or more neural networks.

3. The method of claim 1, wherein two or more of the plurality of sub-streams comprise different numbers of coded bits.

4. The method of claim 3, wherein two or more bit-mapper models map the two or more sub-streams comprising different numbers of coded bits to two or more intermediate symbols, respectively, and wherein two or more machine-learning models associated with the two or more bit-mappers are based on one or more of different model architectures or different model coefficients.

5. The method of claim 1, wherein generating the plurality of sub-streams of coded bits comprises dividing the accessed stream of coded bits into the plurality of sub-streams of coded bits based on a serial-to-parallel conversion.

6. The method of claim 1, wherein the symbol-mapper model is a machine-learning model comprising one or more neural networks.

7. The method of claim 1, further comprising:

receiving, at the first computing system from the second computing, a plurality of parameters via a signaling channel, wherein the plurality of parameters comprise one or more of a number of the plurality of intermediate symbols, a number of the plurality of constellation symbols, a scaling factor, a modulation and coding scheme (MCS), or a bit assignment for signaling.

8. The method of claim 7, further comprising:

generating the signal further based on the plurality of parameters.

9. A first computing system comprising:

one or more non-transitory computer-readable storage media including instructions; and one or more processors coupled to the storage media, the one or more processors configured to execute the instructions to:

access a stream of coded bits;

generate a plurality of sub-streams of coded bits based on the accessed stream of coded bits;

map, based on a plurality of respective bit-mapper models, the plurality of sub-stream of coded bits to a plurality of intermediate symbols, respectively, wherein each of the bit-mapper models is a machine-learning model trained using a loss function configured to minimize an average transmission power for signals subject to a particular bit error rate for signal transmission;

generate, based on a symbol-mapper model, a plurality of constellation symbols from the plurality of intermediate symbols; and transmit a signal generated based on the plurality of constellation symbols to a second computing system.

10. The first computing system of claim 9, wherein two or more of the plurality of sub-streams comprise different numbers of coded bits.

11. The first computing system of claim 9, wherein two or more bit-mapper models map the two or more sub-streams comprising different numbers of coded bits to two or more intermediate symbols, respectively, and wherein two or more machine-learning models associated with the two or more bit-mappers are based on one or more of different model architectures or different model coefficients.

12. The first computing system of claim 9, wherein generating the plurality of sub-streams of coded bits comprises dividing the accessed stream of coded bits into the plurality of sub-streams of coded bits based on a serial-to-parallel conversion.

13. The first computing system of claim 9, wherein the one or more processors are further configured to execute the instructions to:

receive, at the first computing system from the second computing, a plurality of parameters via a signaling channel, wherein the plurality of parameters comprise one or more of a number of the plurality of intermediate symbols, a number of the plurality of constellation symbols, a scaling factor, a modulation and coding scheme (MCS), or a bit assignment for signaling.

14. The first computing system of claim 13, wherein the one or more processors are further configured to execute the instructions to:

generate the signal further based on the plurality of parameters.

15. A computer-readable non-transitory storage media comprising instructions executable by a processor to:

access a stream of coded bits;

generate a plurality of sub-streams of coded bits based on the accessed stream of coded bits;

map, based on a plurality of respective bit-mapper models, the plurality of sub-stream of coded bits to a plurality of intermediate symbols, respectively, wherein each of the bit-mapper models is a machine-learning model trained using a loss function configured to minimize an average transmission power for signals subject to a particular bit error rate for signal transmission;

generate, based on a symbol-mapper model, a plurality of constellation symbols from the plurality of intermediate symbols; and transmit a signal generated based on the plurality of constellation symbols to a second computing system.

16. The media of claim 15, wherein two or more of the plurality of sub-streams comprise different numbers of coded bits.

17. The media of claim 16, wherein two or more bit-mapper models map the two or more sub-streams comprising different numbers of coded bits to two or more intermediate symbols, respectively, and wherein two or more machine-learning models associated with the two or more bit-mappers are based on one or more of different model architectures or different model coefficients.

* * * * *